United States Patent
Ko et al.

(10) Patent No.: US 9,531,527 B2
(45) Date of Patent: Dec. 27, 2016

(54) METHOD AND APPARATUS FOR TRANSMITTING SIGNALS OF USER EQUIPMENT (UE) CONFIGURED TO PERFORM D2D COMMUNICATION IN WIRELESS COMMUNICATION SYSTEM

(71) Applicant: LG ELECTRONICS INC., Seoul (KR)

(72) Inventors: Hyunsoo Ko, Anyang-si (KR); Jiwoong Jang, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 14/377,803

(22) PCT Filed: Feb. 18, 2013

(86) PCT No.: PCT/KR2013/001234
§ 371 (c)(1),
(2) Date: Aug. 8, 2014

(87) PCT Pub. No.: WO2013/122431
PCT Pub. Date: Aug. 22, 2013

(65) Prior Publication Data
US 2015/0023316 A1  Jan. 22, 2015

Related U.S. Application Data

(60) Provisional application No. 61/599,942, filed on Feb. 17, 2012.

(51) Int. Cl.
*H04L 5/14* (2006.01)
*H04L 5/00* (2006.01)
(Continued)

(52) U.S. Cl.
CPC ............ *H04L 5/1469* (2013.01); *H04J 11/003* (2013.01); *H04L 5/0032* (2013.01); *H04L 5/0037* (2013.01);
(Continued)

(58) Field of Classification Search
CPC ..... H04J 11/003; H04L 5/0007; H04L 5/0073; H04L 27/2691; H04W 28/048
See application file for complete search history.

(56) References Cited

U.S. PATENT DOCUMENTS

2006/0245398 A1  11/2006  Li et al.
2007/0291668 A1  12/2007  Duan et al.
(Continued)

FOREIGN PATENT DOCUMENTS

EP  2408243  1/2012
KR  10-2010-0040924  4/2010
(Continued)

OTHER PUBLICATIONS

PCT International Application No. PCT/KR2013/001234, Written Opinion of the International Searching Authority dated May 30, 2013, 12 pages.
(Continued)

*Primary Examiner* — Benjamin H Elliott, IV
(74) *Attorney, Agent, or Firm* — Lee, Hong, Degerman, Kang & Waimey

(57) ABSTRACT

A method for transmitting a signal by a first user equipment (UE) configured to perform device-to-device (D2D) communication in a wireless communication system includes transmitting a signal on a subframe for D2D communication to a second UE configured to perform D2D communication, wherein at least one OFDM symbol from among OFDM symbols contained in the subframe includes a repetition signal.

18 Claims, 9 Drawing Sheets

(51) Int. Cl.
*H04J 11/00* (2006.01)
*H04W 72/02* (2009.01)
*H04W 76/02* (2009.01)
*H04W 92/18* (2009.01)
*H04L 1/04* (2006.01)

(52) U.S. Cl.
CPC .......... *H04L 5/0048* (2013.01); *H04L 5/0053* (2013.01); *H04W 72/02* (2013.01); *H04W 76/023* (2013.01); *H04L 1/04* (2013.01); *H04L 5/0073* (2013.01); *H04W 92/18* (2013.01)

(56) References Cited

U.S. PATENT DOCUMENTS

| | | |
|---|---|---|
| 2009/0069023 A1 | 3/2009 | Ahn et al. |
| 2010/0177722 A1 | 7/2010 | Guvenc et al. |
| 2010/0238908 A1 | 9/2010 | Wu et al. |
| 2010/0265901 A1 | 10/2010 | Koo et al. |
| 2011/0200032 A1 | 8/2011 | Lindstrom et al. |
| 2011/0274081 A1* | 11/2011 | Chun et al. .................. 370/330 |
| 2011/0275382 A1 | 11/2011 | Hakola et al. |
| 2012/0106372 A1* | 5/2012 | Gaal et al. .................. 370/252 |
| 2012/0294163 A1 | 11/2012 | Turtinen et al. |
| 2013/0142268 A1* | 6/2013 | Gao et al. .................. 375/252 |
| 2015/0023316 A1* | 1/2015 | Ko et al. ....................... 370/330 |
| 2015/0036558 A1* | 2/2015 | Ko et al. ....................... 370/280 |

FOREIGN PATENT DOCUMENTS

| | | |
|---|---|---|
| WO | 2010/125427 | 11/2010 |
| WO | 2011/108891 | 9/2011 |
| WO | 2011/149318 | 12/2011 |
| WO | 2012/015238 | 2/2012 |
| WO | 2012/019348 | 2/2012 |

OTHER PUBLICATIONS

United States Patent and Trademark Office Application U.S. Appl. No. 14/374,871, Office Action dated Nov. 4, 2015, 14 pages.
United States Patent and Trademark Office Application U.S. Appl. No. 14/374,871, Office Action dated May 20, 2016, 14 pages.
LG Electronics Inc., "Discussion on Timing Advance Maintenance," 3GPP TSG-RAN WG2 #58bis, R2-072738, Jun. 2007, 4 pages.
PCT International Application No. PCT/KR2013/001235, Written Opinion of the International Searching Authority dated May 30, 2013, 9 pages.
United States Patent and Trademark Office U.S. Appl. No. 14/374,871, Office Action dated Sep. 8, 2016, 16 pages.

* cited by examiner (a)                    (b)

… (1)

METHOD AND APPARATUS FOR TRANSMITTING SIGNALS OF USER EQUIPMENT (UE) CONFIGURED TO PERFORM D2D COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2013/001234, filed on Feb. 18, 2013, which claims the benefit of U.S. Provisional Application Ser. No. 61/599,942, filed on Feb. 17, 2012, the contents of which are hereby incorporated by reference herein in their entirety.

TECHNICAL FIELD

The present invention relates to a wireless communication system, and more particularly to a method and apparatus for transmitting signals of a user equipment (UE) configured to perform device-to-device (D2D) communication.

BACKGROUND ART

A user equipment (UE) existing in a cell of a cellular communication system connects to a base station (BS), receives control information for data communication from the BS, and transmits and receives data to and from the BS, resulting in communication between the UE and the BS. That is, since the UE transmits and receives data to/from the BS, the UE must transmit data to the BS and then the BS must transmit the received data to another UE in such a manner that data communication between one UE and another cellular UE is achieved through the BS. In this way, since one UE can transmit data to another UE through the BS, the BS schedules channels and resources for data transmission/reception and transmits channel and resource scheduling information to each UE.

Device-to-Device (D2D) communication establishes a direct link between user equipments (UEs) such that voice, data, etc. are directly communicated between UEs without passing through an evolved NodeB (eNB). D2D communication may include UE-to-UE communication, Peer-to-Peer communication, and the like. In addition, the D2D communication can be applied to Machine-to-Machine (M2M) communication, Machine Type Communication (MTC), etc.

D2D communication has recently been used as one method for solving BS loads caused by rapidly increasing data traffic. For example, differently from the legacy wireless communication system, D2D communication enables data to be communicated between two or more devices without passing through the BS, resulting in reduction of network overload.

In addition, with the introduction of D2D communication, the number of BS procedures is reduced, power consumption of devices that participate in D2D is reduced, the data transfer rate is increased, the network accommodation capability is increased, and load dissipation and cell coverage extension are expected.

DISCLOSURE

Technical Problem

Accordingly, the present invention is directed to a method and apparatus for transmitting signals of a user equipment (UE) configured to perform D2D communication in a wireless communication system that substantially obviates one or more problems due to limitations and disadvantages of the related art.

An object of the present invention is to provide a signal transmission method for enabling a UE configured to perform D2D communication to minimize interference capable of being affected by a legacy wireless communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting a signal by a first user equipment (UE) configured to perform device-to-device (D2D) communication in a wireless communication system, the method including: transmitting a signal on a subframe for D2D communication to a second UE configured to perform D2D communication, wherein at least one OFDM symbol from among OFDM symbols contained in the subframe includes a repetition signal.

In another aspect of the present invention, a user equipment (UE) apparatus for use in a first UE configured to perform device-to-device (D2D) communication in a wireless communication system, the UE apparatus includes: a transmission module; and a processor, wherein the processor transmits a signal on a subframe for D2D communication to a second UE configured to perform D2D communication, and at least one OFDM symbol from among OFDM symbols contained in the subframe includes a repetition signal.

In another aspect of the present invention, a method for receiving a signal by a second user equipment (UE) configured to perform device-to-device (D2D) communication in a wireless communication system includes: receiving a signal on a subframe for D2D communication from a first UE configured to perform D2D communication, wherein at least one OFDM symbol from among OFDM symbols contained in the subframe includes a repetition signal.

In another aspect of the present invention, a user equipment (UE) apparatus for use in a second UE configured to perform device-to-device (D2D) communication in a wireless communication system includes: a reception module; and a processor, wherein the processor receives a signal on a subframe for D2D communication from a first UE configured to perform D2D communication, and at least one OFDM symbol from among OFDM symbols contained in the subframe includes a repetition signal.

When the second UE receives the signal, the at least one OFDM symbol may be used to reduce interference from an uplink signal transmitted from a third UE adjacent to the second UE to a base station (BS).

The repetition signal may be generated by allocating the signal to an even-th resource element from among resource elements corresponding to the at least one OFDM symbol and allocating no signal an odd-th resource element from among resource elements corresponding to the at least one OFDM symbol.

Power to be allocated to the odd-th resource element may be allocated for signal transmission of the even-th resource element.

The subframe for D2D communication may not allow transmission of a signal of the third UE other than a predetermined signal.

The predetermined signal may include a channel state report, a physical uplink control channel (PUCCH), and a sounding reference signal (SRS).

It is to be understood that both the foregoing general description and the following detailed description of the present invention are exemplary and explanatory and are intended to provide further explanation of the invention as claimed.

Advantageous Effects

As is apparent from the above description, the embodiments of the present invention can enable one UE for signal reception from among a plurality of UEs for D2D communication to reduce interference from another UE of a legacy wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
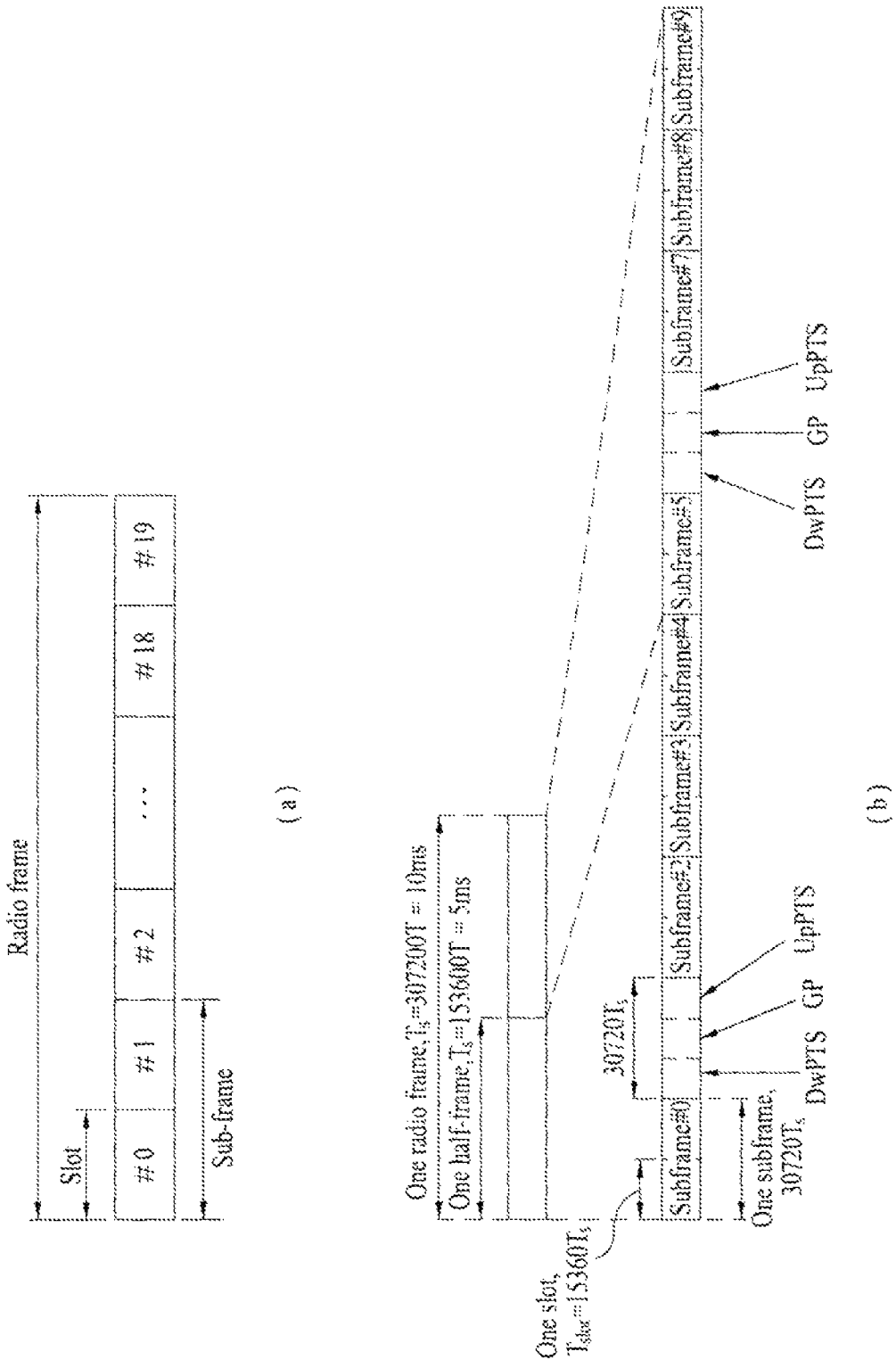
FIG. 1 exemplarily shows a radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

FIG. 1 exemplarily shows a radio frame structure.

The structure of a radio frame in 3GPP LTE system will be described with reference to FIG. 1. In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(a) is a diagram showing the structure of the type 1 radio frame. A radio frame includes 10 subframes, and one subframe includes two slots in the time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called a SC-FDMA symbol or a symbol duration. A RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is unstable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
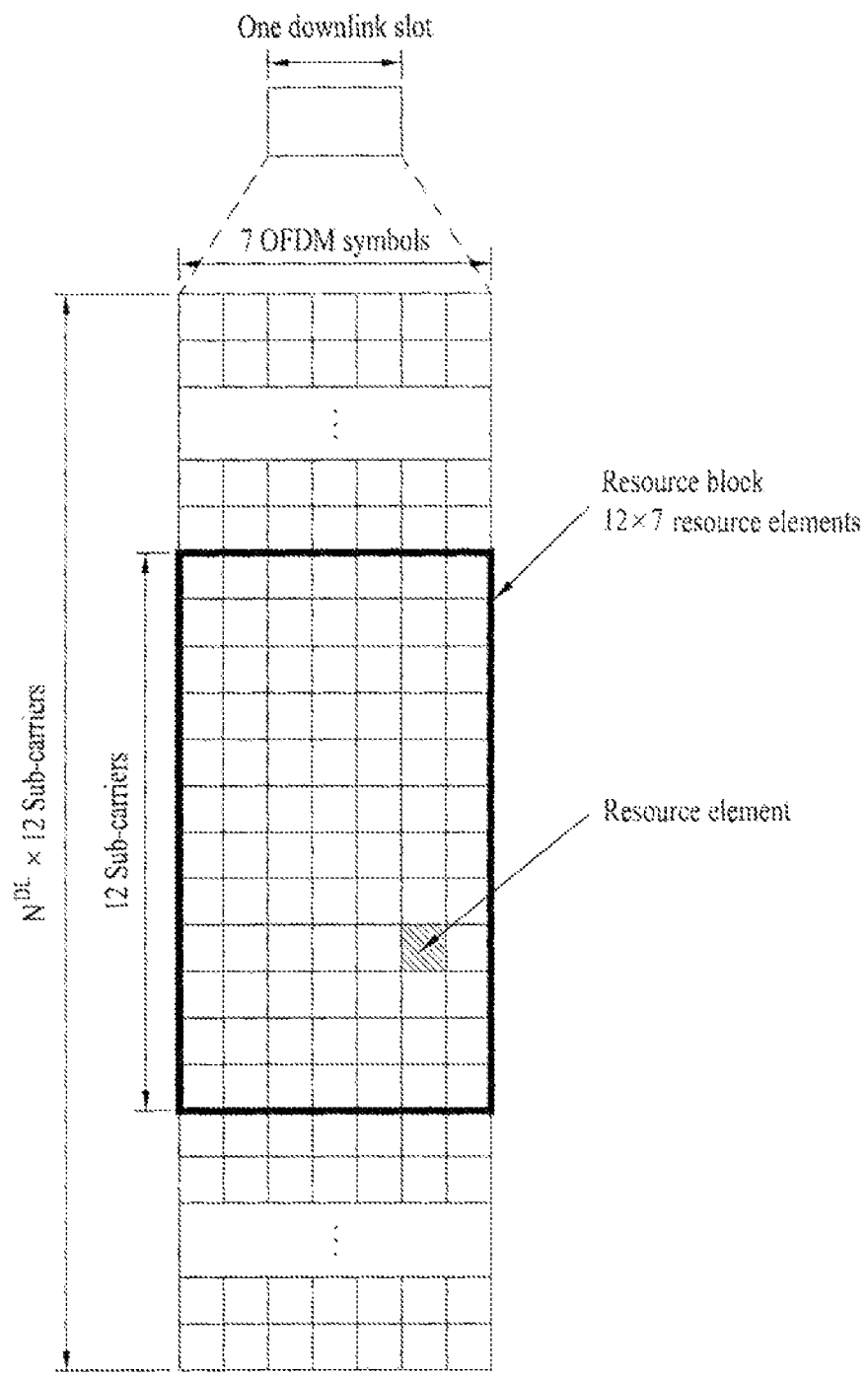
FIG. 2 exemplarily shows a resource grid of a downlink slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
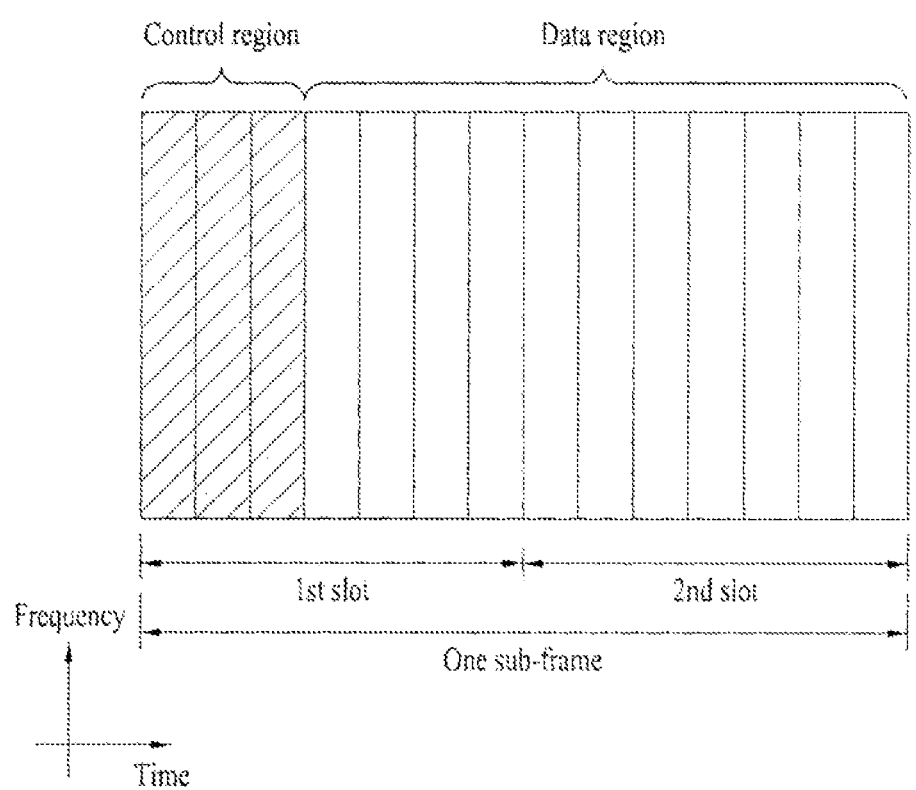
FIG. 3 is a downlink (DL) subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The eNB (or base station) determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
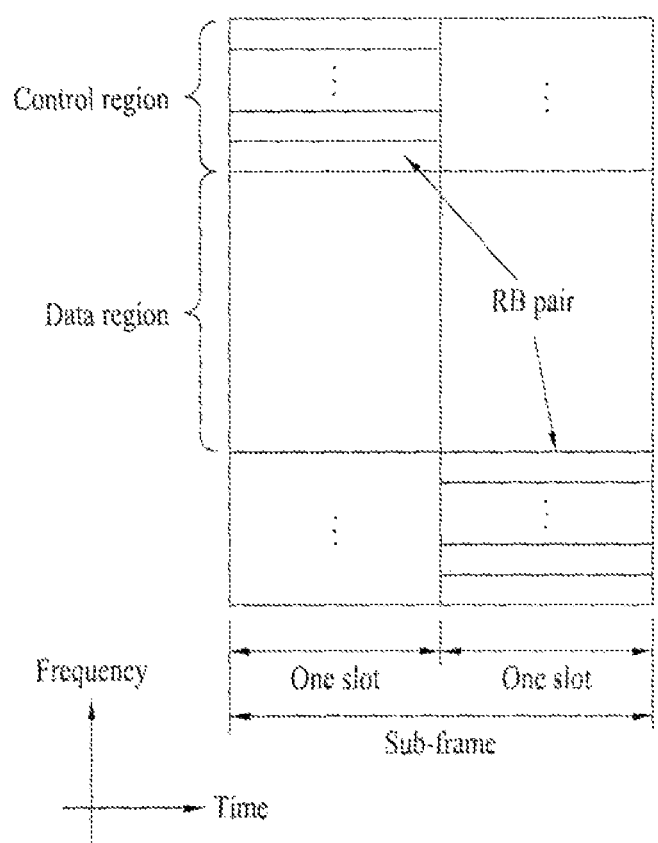
FIG. 4 is an uplink (UL) subframe structure.

FIG. 4 is a diagram showing the structure of an uplink frame. The uplink subframe may be divided into a control region and a data region in a frequency region. A Physical Uplink Control Channel (PUCCH) including uplink control information is allocated to the control region. A Physical Uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Sounding Reference Signal (SRS)

An SRS is used for enabling an eNodeB to measure channel quality so as to perform frequency-selective scheduling on the uplink and is not associated with uplink data and/or control information transmission. However, the present invention is not limited thereto and the SRS may be used for improved power control or supporting of various start-up functions of UEs which are not recently scheduled. Examples of the start-up functions may include, for example, initial Modulation and Coding Scheme (MCS), initial power control for data transmission, timing advance, and frequency-semi-selective scheduling (scheduling for selectively allocating frequency resources in a first slot of a subframe and pseudo-randomly hopping to another frequency in a second slot).

In addition, the SRS may be used for downlink channel quality measurement on the assumption that the radio channel is reciprocal between the uplink and downlink. This assumption is particularly valid in a Time Division Duplex (TDD) system in which the same frequency band is shared between the uplink and the downlink and is divided in the time domain.

The subframe through which the SRS is transmitted by a certain UE within the cell is indicated by cell-specific broadcast signaling. 4-bit cell-specific "srsSubframeConfiguration" parameter indicates 15 possible configurations of the subframe through which the SRS can be transmitted within each radio frame. By such configurations, it is possible to provide adjustment flexibility of SRS overhead according to a network arrangement scenario. The remaining one (sixteenth) configuration of the parameters indicates the switch-off of the SRS transmission within the cell and is suitable for a serving cell for serving high-rate UEs.

The SRS is always transmitted on a last SC-FDMA symbol of the configured subframe. Accordingly, SRS and UL Demodulation RS (DMRS) are located on different SC-FDMA symbols. PUSCH data transmission is not allowed on the SC-FDMA symbol specified for SRS transmission and thus sounding overhead does not approximately exceed 7% even when it is highest (that is, even when SRS transmission symbols are present in all subframes).

Each SRS symbol is generated by the basic sequence (random sequence or Zadoff-Ch (ZC)-based sequence set) with respect to a given time unit and frequency band, and all UEs within the cell use the same basic sequence. At this time, the SRS transmission of the plurality of UEs within the cell in the same time unit and the same frequency band is orthogonally distinguished by different cyclic shifts of the base sequence allocated to the plurality of UEs. The SRS sequences of different cells can be distinguished by allocating different basic sequences to respective cells, but the orthogonality between the different basic sequences is not guaranteed.

D2D Communication

If D2D communication is introduced into the wireless communication system (for example, 3GPP LTE system or 3GPP LTE-A system), a detailed method for performing D2D communication will hereinafter be described in detail.

Figure 5:
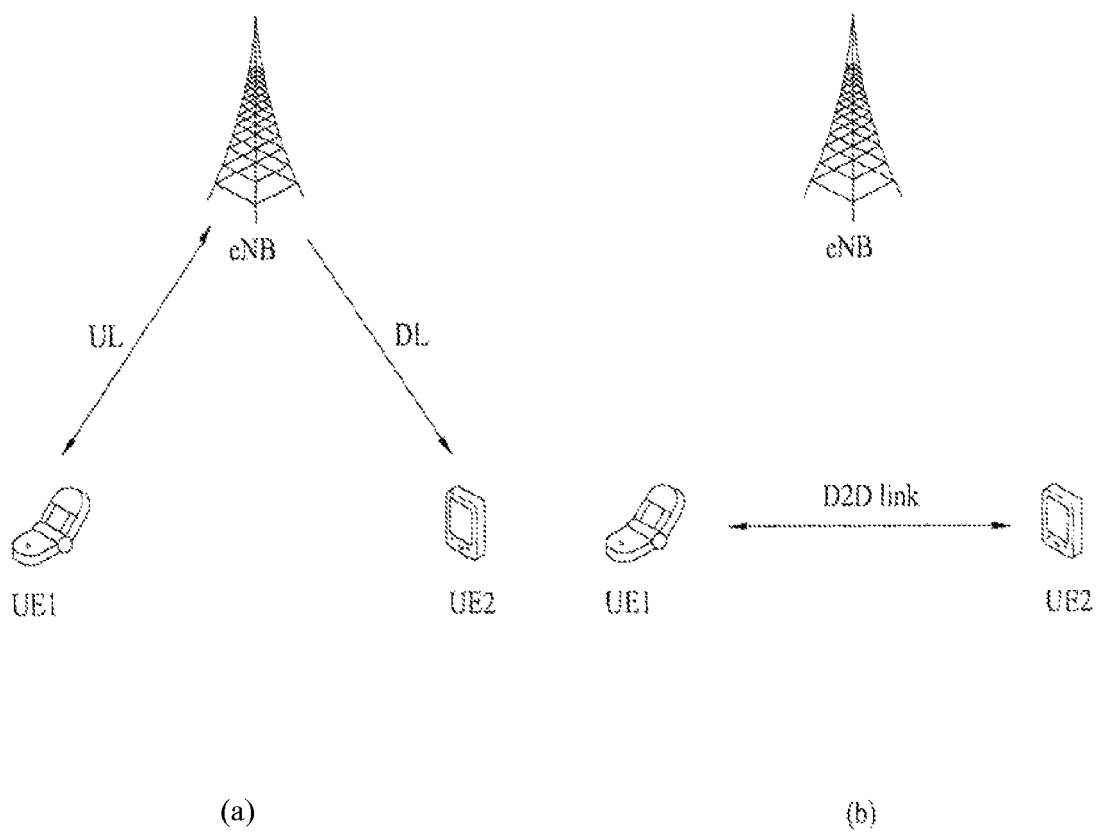
FIG. 5 is a conceptual diagram illustrating D2D communication.

FIG. 5 is a conceptual diagram illustrating D2D communication. FIG. 5(a) is a conceptual diagram illustrating a conventional BS-based communication scheme. Referring to FIG. 5(a), a first UE (UE1) transmits data to an eNode B (eNB) on uplink, and the eNB transmits data from the first UE (UE1) to a second UE (UE2) on downlink.

FIG. 5(b) is a conceptual diagram illustrating UE-to-UE communication serving as one example of D2D communication. Data exchange between UEs can be carried out without passing through the eNB. A link directly established between devices is referred to as a D2D link. D2D communication has shorter latency and less radio resources as compared to the legacy BS-based communication scheme.

D2D communication supports D2D (or UE-to-UE) communication without passing through the eNB and reuses resources of the legacy wireless communication system (for example, 3GPP LTE or LTE-A), such that interference or disturbance must not occur in the legacy wireless communication system. Likewise, generating minimum interference in D2D communication by UE or eNB operating in the legacy wireless communication system is also of importance. Therefore, the following description proposes a variety of D2D communication methods capable of reducing interference between the D2D communication system and the legacy wireless communication system.

Various methods capable of minimizing interference generated in a UE configured to perform D2D communication on the condition that UE interference derives from the legacy wireless communication system will hereinafter be described in detail.

Figure 6:
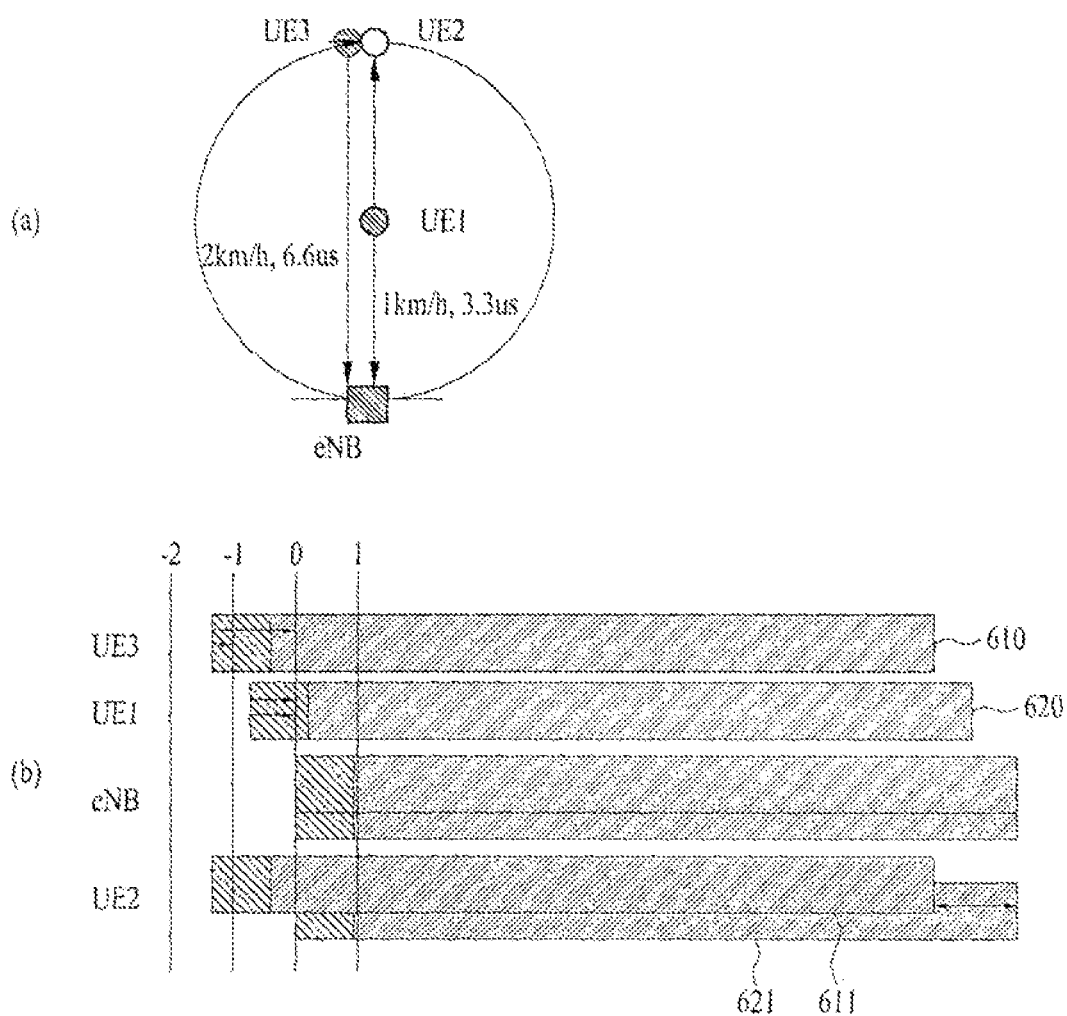
FIGS. 6 and 7 are conceptual diagrams illustrating interference occurred in D2D communication.

FIG. 6 exemplarily shows interference generated in a D2D communication UE affected by the legacy wireless communication system. In more detail, FIG. 6(a) shows a first UE (UE1), a second UE (UE2), a third UE (UE3), and an eNB. Specifically, UE1 and UE2 are configured to perform D2D communication, and UE3 is configured to perform B2D communication with the eNB. It is assumed that the distance between UE1 and eNB is set to 1 km, the distance between UE1 and UE2 is set to 11 cm, the distance between UE3 and eNB is set to 2 km, and UE2 is adjacent to UE3 within a predetermined distance. In addition, it is assumed that UE1 to UE3 transmit signals to the eNB or the D2D communication UE upon receiving a timing advance (TA) value from the eNB. In FIG. 6(a), 'us' indicates a time delay in response to the distance. For this 'us' indication, the following Table 1 is needed, and it is assumed that respective values shown in Table 1 are used as TA values of individual UEs.

TABLE 1

| Distance (km) | Time delay (us) |
|---|---|
| 1 | 3.3 |
| 2 | 6.6 |
| 3 | 10 |
| 15 | 50 |
| 150 | 500 |

In FIG. 6(b), each bar indicates one OFDM symbol, and a dark shaded part indicates a cyclic prefix (CP). In case of the CP length, the following Table 2 can be used as follows.

TABLE 2

| Number of samples (# of Sample) | | Time (us) | |
| --- | --- | --- | --- |
| CP | N_FFT | CP | N_FFT |
| 160 | 2048 | 5.21 | 66.66666667 |
| 144 | 2048 | 4.69 | 66.66666667 |

Referring to FIG. 6(a), when a first UE (UE1) for D2D communication transmits signals to the second UE (UE2), the first UE (UE1) can transmit the signals using its own TA value of 3.3 us. In more detail, the first UE (UE1) can transmit signals to the second UE (UE2) at a time earlier than UE1 time synchronization by a predetermined time of 3.3 us. In this case, the second UE (UE2) can receive signals at almost correct time synchronization in the same manner as in the eNB. The third UE (UE3) communicating with the eNB transmits a UL signal using its own TA value of 6.6 us.

In this case, the UL signal of the third UE (UE3) is applied not only to the eNB but also to the second UE (UE2) performing D2D communication. In this case, the UL signal of the third UE (UE3) may generate large interference when UE2 receives signals from UE1. Referring to FIG. 6(b), UE3 transmits an OFDM symbol 610 using a TA value of 0.66 us, and UE1 transmits an OFDM symbol 620 using a TA value of 3.3 us. Although the OFDM symbols 610 and 620 arrive at the eNB at the same time as denoted by 612, the OFDM symbol 611 transmitted from the third UE UE3 arrives at the second UE (UE2) earlier than the OFDM symbol 621 from the first UE (UE1) by a predetermined time of about 6.6 us. (Generally, assuming that the distance between D2D communication UEs is set to L, a maximum difference in delivery time from the B2D communication UE to the D2D communication UE may be defined as "2×L×3.3 us"). In this case, a UE3 signal that is leading by 6.6 us causes Inter Symbol Interference (ISI) when a signal transmitted from the first UE (UE1) is decoded. That is, as shown in FIG. 6, a time difference between the OFDM symbol from the third UE (UE3) and the OFDM symbol from the first UE (UE1) does not correspond to 4.69 us or less (even in the case where each OFDM symbol is a first OFDM symbol of a subframe), orthogonality of received signals is not guaranteed.

Figure 7:
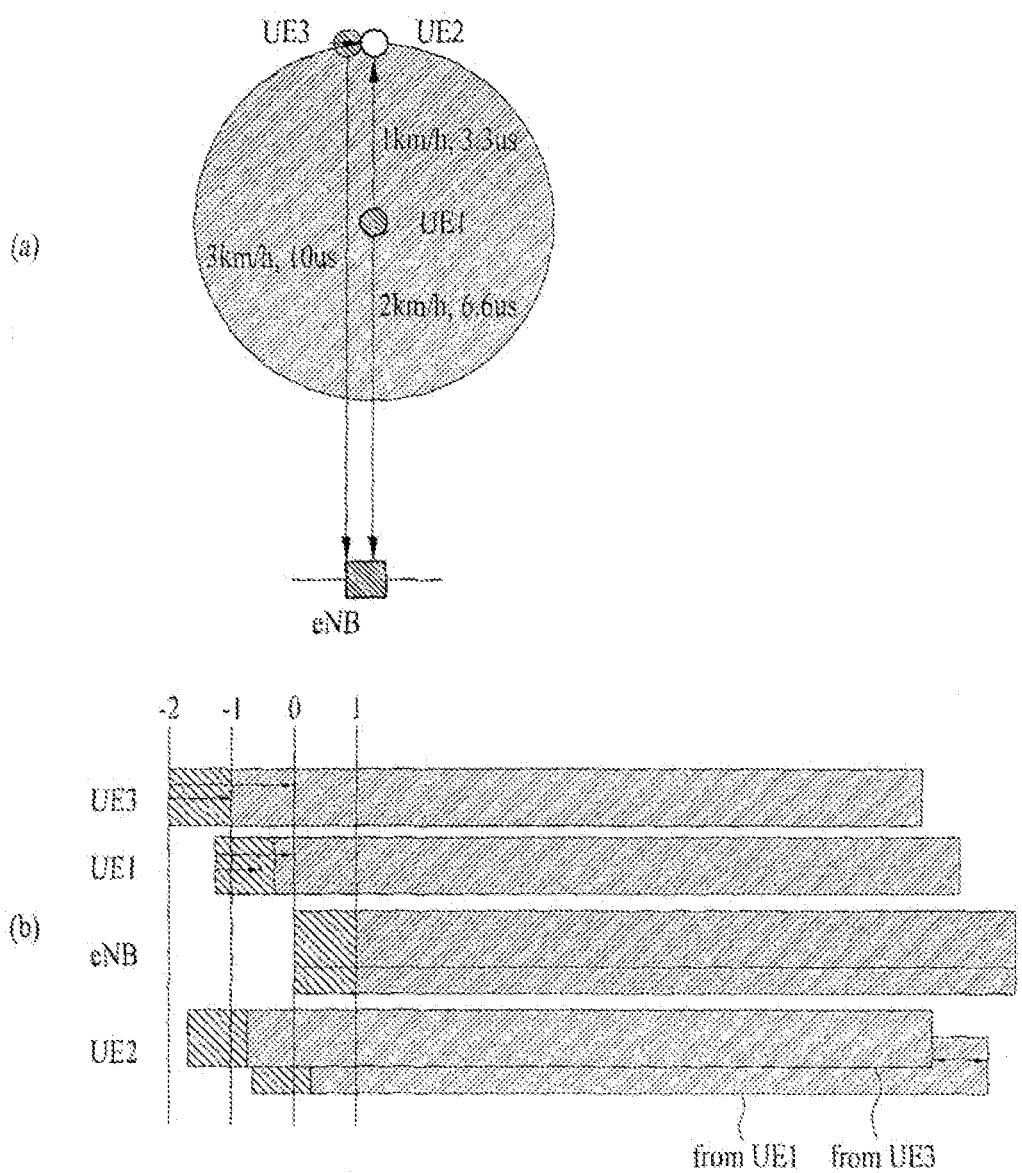

Interference generated in the B2D communication UE located close to the D2D communication UE may also occur in FIG. 7. Referring to FIG. 7(a), a third UE (UE3) is spaced apart from the eNB by 3 km, a first UE (UE1) is spaced from the eNB by 2 km, and the first UE (UE1) is spaced apart from the second UE (UE2) by 1 km. Referring to FIG. 7(b), a maximum time difference between a first time and a second time is 6.6 us, wherein the first time is a time consumed when a transmission signal from the first UE (UE) arrives at the second UE (UE2) and the second time is a time consumed when a transmission signal of the third UE (UE3) arrives at the second UE (UE2 in the same manner as in FIG. 6. However, since the third UE (UE3) is located distant from the eNB as shown in FIG. 7, signal transmission is achieved at higher power, such that such signals may generate more serious interference in the second UE (UE2).

As can be seen from FIGS. 6 and 7, when the second UE (UE2) for D2D communication receives signals from the first UE (UE1), UL transmission of the B2D communication UE3 (i.e., third UE) located close to the second UE (UE2) may cause interference to signal reception of UE2. In order to solve this problem, orthogonal time resource allocation for D2D communication, repetition signal transmission within a time interval, and OFDM symbol puncturing according to embodiments of the present invention will hereinafter be described in detail.

First, in order to enable the B2D communication UE to reduce ISI applied to the D2D communication UE, orthogonal time resources can be allocated for D2D communication and B2D communication. Although B2D communication users and D2D communication users coexist and frequency resources for the B2D communication are separated from frequency resources for the D2D communication, ISI encountered in the time interval is not solved, such that the above description can be understood as accessing in terms of time resources. For this purpose, time resources are allocated to a specific time interval in such a manner that D2D communication users can mainly occupy the time resources, and time resources are allocated to a specific time interval in such a manner that B2D communication users can mainly occupy the time resources. For example, subframes serving as time resources may be classified into subframes for D2D communication and subframes for B2D communication. In more detail, the eNB may indicate numbers of subframes for D2D communication through higher layer signaling. Alternatively, subframes are classified into two sets, one of the two sets may be established for B2D communication, and the other one of the two sets may be established for D2D communication. The set establishment may be transmitted to the UE through RRC signaling of the eNB.

In this case, the D2D communication subframes may be exclusively established in such a manner that the D2D communication subframes are not used for B2D communication at all. A predetermined degree may also be used for B2D communication as necessary. Assuming that some parts of D2D communication subframes are used for B2D communication, ACK/NACK, CQI report, PUCCH for Scheduling Request, and Sounding Reference Signal (SRS) for assisting a channel state measure may be used. In this case, whereas the D2D communication subframes are exclusively established, items defined in the legacy LTE/LTE-A system need not be changed.

Second, in order to enable the B2D communication UE to reduce ISI applied to the D2D communication UE, repetition signal transmission within a time interval may be achieved. The above-mentioned features can be applied not only to all OFDM symbols contained in one subframe but also to some OFDM symbols. In other words, when making the subframe composed of M OFDM symbols, N OFDM symbols may be transmitted in a different way from M-N OFDM symbols.

Implementation of repetition signal transmission will hereinafter be described in detail.

When a time-domain signal having a length, N_ofdm=N_cp+N_fft (where N_ofdm is the number of OFDM samples, N_cp is the number of CP samples, and N_fft is an FFT size), is transmitted, the transmission signal may be repeated within the FFT size (N_fft). For example, if the transmission signal is repeated two times, the (N_fft/2)-length signal may be repeated two times during the time N_fft.

In order to generate the repetition signal, the interleaved-type resource allocation method can be used, in which a signal in association with resources on a frequency domain is transmitted at an even-th RE, and no signal is transmitted at an odd-th RE. In this case, since power of the RE at which no signal is transmitted can be used at another RE at which a signal is transmitted, 3 dB boosting may be possible such that signal(s) can be transmitted at higher intensity. In addition, since the distance between frequency tones is longer, it is possible to provide more robust data transmission from inter carrier interference (ICI) caused by a frequency offset.

Figure 8:
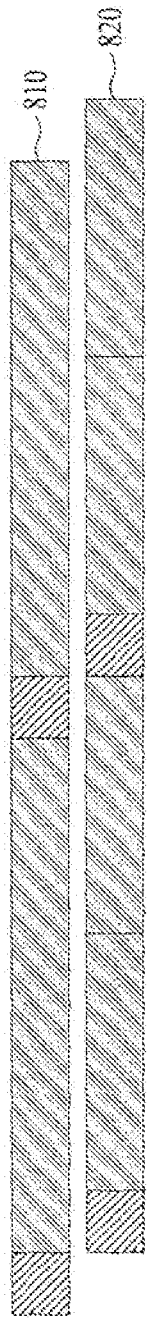
FIG. 8 is a conceptual diagram illustrating a repetition signal according to an embodiment of the present invention.

In addition, the above-mentioned repetition signal transmission may be used independently from orthogonal time resource allocation or may also be used along with the orthogonal time resource allocation. In more detail, in the case of establishing D2D subframes, when SRS and the like for B2D communication are transmitted even in the D2D subframes, unexpected interference may occur in the UE configured to perform D2D communication due to SRS transmission. That is, referring back to FIGS. 6 and 7, when the third UE adjacent to the second UE transmits the SRS in a subframe in which the first UE transmits D2D communication signals to the second UE, the second UE may use the SRS derived from the third UE as an ISI when decoding the signal received from the first UE. Specifically, interference caused by SRS may affect not only the last OFDM symbol to which the SRS is transmitted but also an OFDM symbol located right before the last OFDM symbol. Therefore, in order to minimize influence of interference caused by SRS transmission of the third UE, the first UE performing D2D communication may apply the above-mentioned repetition signal transmission to the last OFDM symbol (or last two OFDM symbols) when the first UE transmits signals to the second UE. That is, as shown in FIG. 8, the repetition signal may be transmitted to the last two OFDM symbols as denoted by 820, resulting in reduction of ISI caused by UL SRS transmission 810 of the third UE.

Third, in order to enable the B2D communication UE to reduce ISI applied to the D2D communication UE, an OFDM symbol can be punctured.

SC-FDMA transmission is characterized in that a time-domain signal is converted into a frequency-domain signal through DFT-spreading and is reconverted into a time-domain signal through IFFT processing, resulting in maintenance of low PAPR. In this case, some signals from among time-domain signals obtained through IFFT processing can be punctured to reduce influence from ISI. For this purpose, when constructing the modulated symbol sequence prior to DFT spreading, a null signal is inserted into some modulated symbols from among the modulated symbol sequences, such that a specific part of the OFDM symbol obtained through IFFT processing can be punctured.

Assuming that the length of about N_A is punctured on the basis of the length of N_FFT, if signal puncturing is achieved at the ratio of about (a=N_TA/N_FFT), a null signal can be inserted into the symbol length of about (N_DFTxa) when the modulated symbol sequence is constructed for DFT spreading.

Various methods for minimizing interference generated in the D2D communication UE affected by the legacy wireless communication system have been disclosed as described above. A method for enabling the D2D communication UE to reduce influence applied to the legacy system will hereinafter be described. A representative method is definition of a TA value for D2D communication. If a signal arriving at the eNB deviates from the CP length as described above, UL orthogonality is not guaranteed such that unexpected interference may occur. In other words, a signal transmitted from the D2D communication UE to another UE may arrive at the eNB according to the UE location relationship. In this case, if a TA used by the D2D communication UE is not properly defined, interference may occur in the eNB.

For this purpose, the D2D communication UE may establish the same D2D-communication TA value (first TA value) as a B2D-communication TA value (second TA value) having received from the eNB as a MAC control element. In this case, although the UE transmits signals to another UE for D2D communication, signal transmission is achieved using a TA value adjusted for the eNB, resulting in reduction of interference applied to the eNB. However, the B2D communication UE may generate interference in the D2D communication UE, such that the above-mentioned methods can be simultaneously used.

Second, a UE configured to transmit a time-synchronization reference signal from among D2D communication UEs may set the highest TA value from among TA values defined for B2D communication to a D2D communication TA value.

Third, a UE configured to transmit a time-synchronization reference signal from among D2D communication UEs may use a TA value, that is obtained when a TA value received for B2D communication is added to a predetermined value, as a TA for D2D communication. For example, assuming that a TA value established for B2D communication is denoted by TA_B2D, signals can be transmitted in consideration of TA_add on the basis of TA_B2D. That is, TA_D2D=TA_B2D+TA_add may be established, where TA_add may be a fixed value or a designated value. If TA_add is set to a fixed value, TA_add may be established to have about CP duration or may also be established to have an integer multiple of the CP length. Alternatively, TA_add may be set to N (may be an integer) defined according to D2D duration and UE category. If TA_add is set to a designated value, a TA_add value may be indicated by the eNB as an example.

On the other hand, different frequency bands for B2D communication and D2D communication may be established independently from D2D communication methods or simultaneously with the D2D communication methods.

If a system bandwidth for B2D communication is set to M-MHz as an example of a method for establishing different frequency bands distinguished from D2D communication, the system bandwidth for D2D communication may be less than M. For example, a 20 MHz system bandwidth for B2D communication may be set to a 1.5 MHz system bandwidth for D2D communication. In this case, the D2D communication UE detects a specific frequency band signal using a low pass filter, such that the remaining band signals other than a D2D communication band may be filtered so that interference may be removed. Alternatively, the D2D communication UE attempts to perform subsampling in a time domain such that a D2D signal transmitted within a small-range system bandwidth can be obtained.

As one example of a method for establishing different frequency bands distinguished from D2D communication, signals can be transmitted and received for D2D communication according to a system parameter defined in response to a D2D system bandwidth.

Figure 9:
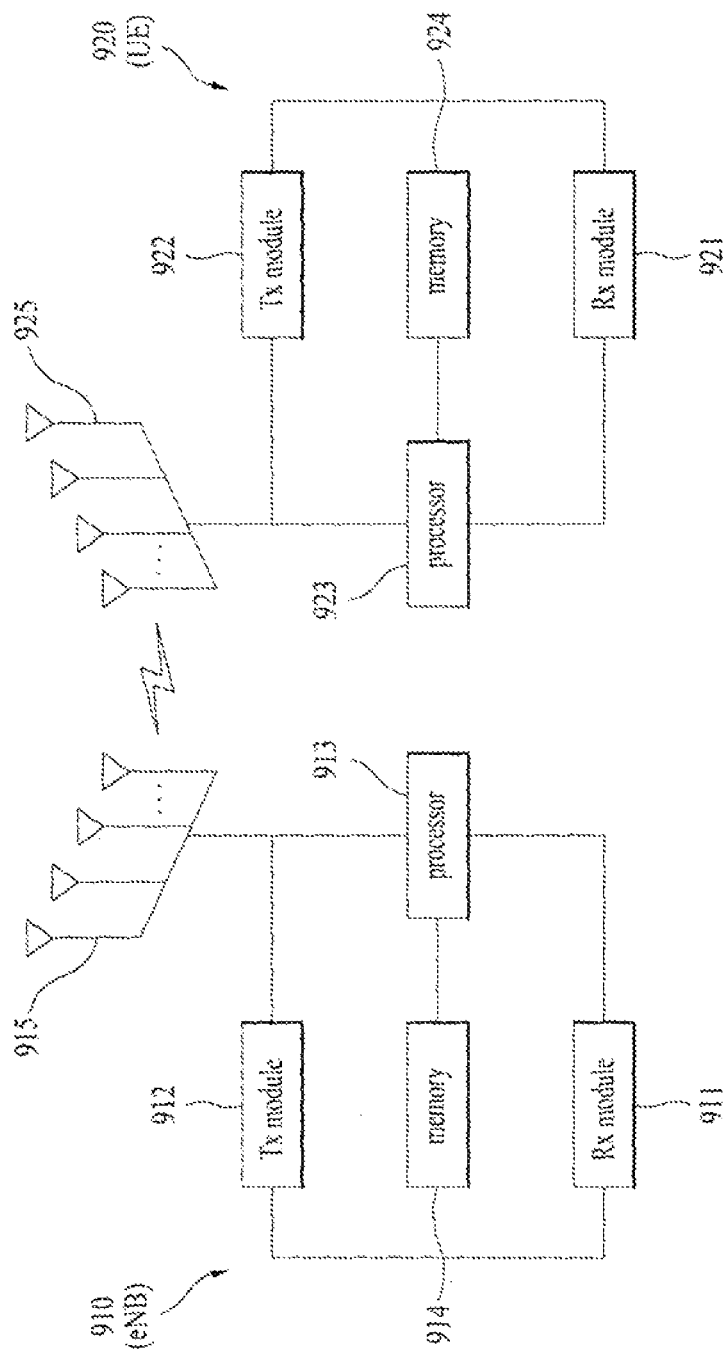
FIG. 9 is a block diagram illustrating a transceiver apparatus.

FIG. 9 is a block diagram illustrating a UE apparatus according to one embodiment of the present invention.

Referring to FIG. 9, the transmission point apparatus 910 according to the present invention may include a reception (Rx) module 911, a transmission (Tx) module 912, a processor 913, a memory 914, and a plurality of antennas 915. The plurality of antennas 915 indicates a transmission point apparatus for supporting MIMO transmission and reception. The reception (Rx) module 911 may receive a variety of signals, data and information on an uplink starting from either the UE or the RN. The Tx module 912 may transmit a variety of signals, data and information on a downlink for the UE. The processor 913 may provide overall control to the transmission point apparatus 910.

The processor 913 of the transmission point apparatus 910 according to one embodiment of the present invention can process items requisite for D2D communication.

The processor 913 of the transmission point apparatus 910 processes information received at the transmission point apparatus 910 and transmission information to be transmitted externally. The memory 914 may store the processed information for a predetermined time. The memory 914 may be replaced with a component such as a buffer (not shown).

Referring to FIG. 9, the UE apparatus 920 may include an Rx module 921, a Tx module 922, a processor 923, a memory 924, and a plurality of antennas 925. The plurality of antennas 925 indicates a UE apparatus for supporting MIMO transmission and reception. The Rx module 921 may receive downlink signals, data and information from the eNB. The Tx module 922 may transmit uplink signals, data and information to the eNB. The processor 923 may provide overall control to the UE apparatus 920.

The processor 923 of the UE apparatus 920 according to one embodiment of the present invention can process items requisite for D2D communication.

The processor 923 of the UE apparatus 920 processes information received at the UE apparatus 920 and transmission information to be transmitted externally. The memory 924 may store the processed information for a predetermined time. The memory 924 may be replaced with a component such as a buffer (not shown).

The specific configurations of the transmission point apparatus and the UE apparatus may be implemented such that the various embodiments of the present invention are performed independently or two or more embodiments of the present invention are performed simultaneously. Redundant matters will not be described herein for clarity.

The description of the transmission point apparatus 910 shown in FIG. 9 may be applied to the eNB (BS), or may also be applied to a relay node (RN) acting as a DL transmission entity or UL reception entity without departing from the scope or spirit of the present invention. In addition, the description of the UE apparatus 920 may be applied to the UE, or may also be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory so that it can be driven by a processor. The memory is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for transmitting a signal by a first user equipment (UE) configured to perform device-to-device (D2D) communication in a wireless communication system, the method comprising:
   transmitting a signal on a subframe for D2D communication to a second UE configured to perform D2D communication,
   wherein at least one OFDM symbol from among OFDM symbols contained in the subframe includes a repetition signal, and
   wherein the at least one OFDM symbol is processed by the second UE to reduce interference from an uplink signal transmitted to a base station from a third UE adjacent to the second UE.

2. The method according to claim 1, wherein the repetition signal is generated by allocating the signal to an even-th resource element from among resource elements corresponding to the at least one OFDM symbol and allocating no signal to an odd-th resource element from among the resource elements corresponding to the at least one OFDM symbol.

3. The method according to claim 2, wherein power to be allocated to the odd-th resource element is allocated for signal transmission of the even-th resource element.

4. The method according to claim 1, wherein the subframe for D2D communication does not allow transmission of a signal of the third UE other than a predetermined signal.

5. The method according to claim 4, wherein the predetermined signal includes a channel state report, a physical uplink control channel (PUCCH), and a sounding reference signal (SRS).

6. A method for receiving a signal by a first user equipment (UE) configured to perform device-to-device (D2D) communication in a wireless communication system, the method comprising:

receiving a signal on a subframe for D2D communication from a second UE configured to perform D2D communication, wherein at least one OFDM symbol from among OFDM symbols contained in the subframe includes a repetition signal, and wherein the at least one OFDM symbol is processed by the second UE to reduce interference from an uplink signal transmitted to a base station from a third UE adjacent to the first UE.

7. The method according to claim 6, wherein the repetition signal is generated by allocating the signal to an even-th resource element from among resource elements corresponding to the at least one OFDM symbol and allocating no signal to an odd-th resource element from among the resource elements corresponding to the at least one OFDM symbol.

8. The method according to claim 7, wherein power to be allocated to the odd-th resource element is allocated for signal transmission of the even-th resource element.

9. The method according to claim 6, wherein the subframe for D2D communication does not allow transmission of a signal of the third UE other than a predetermined signal.

10. The method according to claim 9, wherein the predetermined signal includes a channel state report, a physical uplink control channel (PUCCH), and a sounding reference signal (SRS).

11. A user equipment (UE) apparatus for use in a first UE configured to perform device-to-device (D2D) communication in a wireless communication system, the UE apparatus comprising:

a transmission module; and a processor, wherein that transmits a signal on a subframe for D2D communication to a second UE configured to perform D2D communication, wherein at least one OFDM symbol from among OFDM symbols contained in the subframe includes a repetition signal, and wherein the at least one OFDM symbol is processed by the second UE to reduce interference from an uplink signal transmitted to a base station from a third UE adjacent to the second UE.

12. A user equipment (UE) apparatus for use in a first UE configured to perform device-to-device (D2D) communication in a wireless communication system, the UE apparatus comprising:

a reception module; and a processor that receives a signal on a subframe for D2D communication from a second UE configured to perform D2D communication, wherein at least one OFDM symbol from among OFDM symbols contained in the subframe includes a repetition signal, and wherein the at least one OFDM symbol is processed by the second UE to reduce interference from an uplink signal transmitted to a base station from a third UE adjacent to the first UE.

13. The UE of claim 11, wherein the repetition signal is generated by allocating the signal to an even-th resource element from among resource elements corresponding to the at least one OFDM symbol and allocating no signal to an odd-th resource element from among the resource elements corresponding to the at least one OFDM symbol.

14. The UE of claim 11, wherein the subframe for D2D communication does not allow transmission of a signal of the third UE other than a predetermined signal.

15. The UE of claim 14, wherein the predetermined signal includes a channel state report, a physical uplink control channel (PUCCH), and a sounding reference signal (SRS).

16. The UE of claim 12, wherein the repetition signal is generated by allocating the signal to an even-th resource element from among resource elements corresponding to the at least one OFDM symbol and allocating no signal to an odd-th resource element from among the resource elements corresponding to the at least one OFDM symbol.

17. The UE of claim 12, wherein the subframe for D2D communication does not allow transmission of a signal of the third UE other than a predetermined signal.

18. The UE of claim 17, wherein the predetermined signal includes a channel state report, a physical uplink control channel (PUCCH), and a sounding reference signal (SRS).

* * * * *